March 21, 1933.  A. MEUTSCH  1,902,513
METHOD OF MAKING AND HARDENING STEEL TOOLS
PROVIDED WITH HARD METAL MEMBERS
Filed Aug. 15, 1931
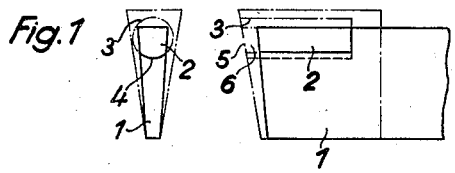
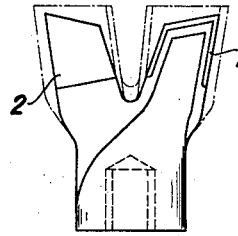
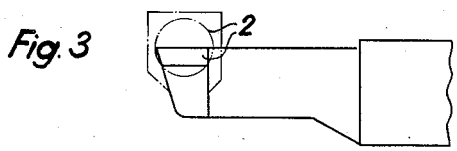
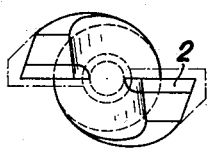
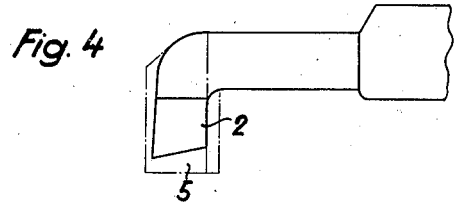
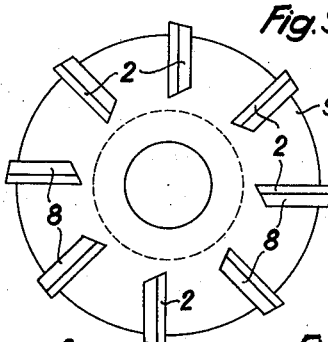
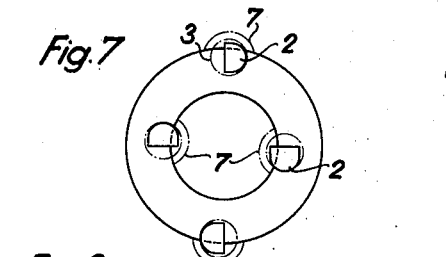
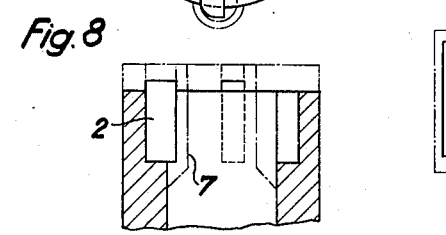
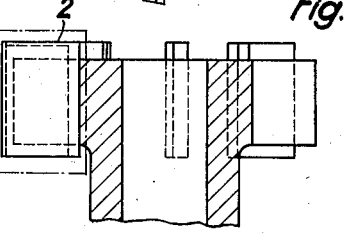
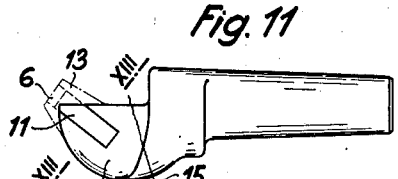
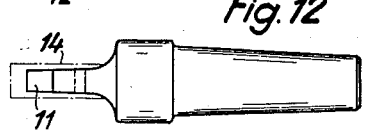
INVENTOR:
Adolf Meutsch Patented Mar. 21, 1933

1,902,513

UNITED STATES PATENT OFFICE

ADOLF MEUTSCH, OF ESSEN, GERMANY, ASSIGNOR TO GEWERKSCHAFT WALLRAM, OF ESSEN, GERMANY

METHOD OF MAKING AND HARDENING STEEL TOOLS PROVIDED WITH HARD METAL MEMBERS

Application filed August 15, 1931, Serial No. 557,337, and in Germany May 6, 1930.

The present invention relates to a novel method of making and hardening steel tools provided with hard metal members, and this application is a continuation in part of my co-pending application Ser. No. 476,473 filed August 20, 1930.

The use of ordinary tools for working metal, porcelain, rock and similar hard materials is made possible, or rendered more effective, by means of hard metal members united with the tools to form a cutting edge. It has been found, however, that such tools could not be utilized up to the limit of efficiency of their hard metal cutting edges, since no material was available for the member carrying the hard metal portions, which would combine sufficient toughness with ample resistance to bending stresses and surface pressure.

If the hard metal portions of the tools are carried by steel members, the latter are particularly wanting when subjected to higher stresses, as the steel parts supporting the hard metal portions and taking up the components of cutting pressure are, at full utilization of the latter, exposed to so great a surface pressure that they are either squeezed away entirely or at least deformed so as to cause the breaking of the soldered connection between them and the hard metal portion. Moreover, at maximum strains, especially in case of tools having a considerable sweep like internal cutters, cutting-off tools, drills and the like, the bending strength of steel is exceeded a great deal.

The oxidation (decarbonization) in itself of the hard metal is prevented, true, with very careful operation and uniform gradual heating to the temperature concerned, by covering the hard metal piece with the flux (borax). In quenching in water or oil, however, it may easily occur that this covering gets lost partially or wholly, so that in this case the prevention of the oxidation is always questioned. If no covering means is made use of, oxidation takes place in a particularly high degree under the co-operation of the quenching means so that frequently a layer of ½mm thickness of the hard metal is completely embrittled and must be ground off.

Much more troublesome, however, than the eventual deterioration of the hard metal piece by oxidation is the embrittling of the whole hard metal piece caused by the quenching. For, after such a hard metal-tipped steel tool has been hardened, the hard metal bit shows always furrowed with fine capillary cracks which grow larger and larger in any subsequent ever so slight heating, so that the hard metal breaks out in use and the tool becomes useless.

As all experiments, made by selecting another solder, another steel material and another shape, to overcome the formation of capillary cracks due to the quenching have ended without any success, there was nothing left but to use unhardened steel shanks as carrier for the hard metal bits and to put up therefor with a smaller strain the tool can be exposed to. Also the sideway, viz. to use high speed steel for the tool shank in lieu of the carbon steel, is not practicable, because high speed steel takes on the copper solder only badly owing to its being an alloyed steel.

According to the invention, the tool is made by overdimensioning its blank and inserting therein the hard metal member so that during the hardening of the tool the hard metal member is surrounded on all sides by a protective metal cover while after the hardening the excess steel or metal portions are removed by grinding or the like to impart to the tool its final shape. In this way the problem of hardening a high duty steel tool provided with hard metal members is solved for the first time.

It will be evident that by the process according to the invention the oxidation is prevented at any rate with greater certainty than by the mere covering with borax and the like, since the quenching oil or water is at any rate not capable to shift aside the covering metal, as it is the case with covering with borax. Furthermore, the fact that also the formation of capillary cracks is avoided, is due probably to the speed of the temperature change in quenching being reduced to such an extent by the comparatively thick metal envelope surrounding the hard metal piece, that the shrinking phenomena in the hard metal, itself, in the solder and in the tool shank take a course which is harmless for the hard metal.

By way of example, a number of tools adapted for the application of the process mentioned are shown in the accompanying drawing, in which Figure 1 is a front view of a cutting-off tool;

Fig. 2, a side view thereof;
Fig. 3, a side view of an inside tool;
Fig. 4, a top view thereof;
Fig. 5, a side view of a rock drill;
Fig. 6, a top view thereof;
Fig. 7, a top view of a boring head;
Fig. 8, a side view thereof in section;
Fig. 9, a top view of a cutter head;
Fig. 10, a side view thereof in section;
Fig. 11, a side view of a pick for coal-cutting;
Fig. 12, a side view thereof; and
Fig. 13, a section on the line XIII—XIII, of Fig. 11.

In the drawing, the final shape of the tools ready for service is indicated by solid lines while the overdimensions of the tool blank can be recognized by the lines consisting of dots and dashes. In the cutting-off tool, Figs. 1 and 2, the front end 1 of the blank is made so thick that a receiving hole 3 of sufficient width can be prepared for the hard metal member 2. The hole has here preferably the form of a cylindrical bore which can be easily produced and which affords the added advantage that the hard metal member 2 fits into the finished tool with a curved surface 4 whereby a better hold is attained relative to transverse stresses also. The overmeasures of the blank are dimensioned so that when the hard metal member is inserted a hollow space 6 is formed at the inlet opening 5 of the bore hole. This hollow space 6 may be filled with a snugly fitting steel member or with another material capable of retaining its packing capacity while exposed to the hardening temperature, and connected therewith by riveting so as to protect the hard metal member from growing tender and receiving cracks during hardening the hard metal holder at this point too.

Preferably, however, the provision of special removable or insertable steel members is avoided by combining the brazing and hardening steps into one operation. This is done by introducing after the insertion of the hard metal member in the bore 3 and after bringing the tool up to soldering heat enough hard solder in the bore to fill the hollow space 6 and to fully cover the hard metal member. Then heating is increased up to hardening temperature and chilling effected in the presence of the protective cover of the surrounding steel and the covering hard solder. To avoid the necessity of grinding away excess portions of the hard metal member during the subsequent removal of the superfluous steel portions, the hard metal member is preferably inserted in its final shape from the very start. Lateral hollow spaces which might form in the bore hole can be filled with hard solder or the like.

In the same way any other steel tool can be treated. For example, in the inside tool shown in Figs. 3 and 4 the hard metal member 2 may be received also in a cylindrical bore of the blank. To save hard solder the lateral hollow spaces in the bore could be filled in this case with corresponding soft iron parts. In the rock drill shown in Figs. 5 and 6 the blank may be constructed in its upper portion either as rotary body or, if made as drop forging, with correspondingly formed blades. In the boring head, Figs. 7 and 8, the blank compared with the final form will require merely a raised face and the oblong bosses 7 arranged at the circumference and covering the inserted parts 2.

In the pick for coal-cutting machines according to Figs. 11 to 13, in which in accordance with the original application Ser. No. 476,473 the hard metal member is inserted in the form of a prismatic or cylindrical rod 11 obliquely to the longitudinal direction of the pick in the pick head 12, the blank is provided with an obliquely attached portion 13 and with a broadening 14 (Fig. 12) on both sides. The portion 13 is so long that after the introduction of the hard metal member 11 in front thereof a hollow space 6 is formed (Fig. 11) for the reception of the protective hard solder. When the excess portions of the pick are ground off after the hardening operation, the two sides of the hard metal member 11 will be exposed, as indicated in Fig. 13, and in the finished pick the hard metal member will be surrounded on top and bottom by hardened steel so as to be effectively supported relative to tilting also. As the hardening affects also the rearward portions of the pick head, the resistance of the pick to impacts which could become dangerous particularly for the zone marked 15 in Fig. 11 will be increased very considerably.

In many cases it will suffice to harden only some inserted members carrying the hard metal member instead of the entire tool. Such a construction is shown for instance in the cutter head in Figs. 9 and 10, wherein the hard metal members 2 are carried by the inserted members 8 which are treated separately in the manner described above and inserted in the cutter head carrier 9 after receiving their final shape. The carrier 9 might be hardened also of course if necessary.

I claim:—

1. The method of making and hardening steel tools provided with hard metal members consisting in forming a cavity in the tool, inserting the hard metal member into the said cavity, closing up the said cavity with a metal covering means, heating up to hardening temperature and chilling the tool together with the covered hard metal member, and exposing the hard metal cutting edges by removing the covering means.

2. The method of making and hardening steel tools provided with hard metal members consisting in forming a bore in the tool of greater length than the hard metal member, inserting the hard metal member in the said bore, filling the free space above the hard metal member closely with a metal covering means, heating up to hardening temperature and chilling the tool together with the covered hard metal member, and exposing the hard metal cutting edges by removing the covering means.

3. The method of making and hardening steel tools provided with hard metal members consisting in forming a cylindrical bore in the tool exceeding in length the hard metal member, inserting the hard metal member in the said bore, filling the free space above the hard metal member closely with a metal covering means, heating up to hardening temperature and chilling the tool together with the covered hard metal member, and exposing the hard metal cutting edges by removing the covering means whereby the remaining supporting surface of the tool forms a part of the cylindrical bore.

4. The method of making and hardening steel tools provided with hard metal members consisting in forming a cavity in the tool, inserting the hard metal member in the said cavity, covering the said cavity by means of liquefied hard solder, heating up to hardening temperature and chilling the tool together with the covered hard metal member, and exposing the hard metal cutting edges by removing the covering means.

5. The method of making and hardening steel tools provided with hard metal members consisting in constructing the tool blank with overmeasures, forming a cavity in the said blank, inserting the solid hard metal member into said cavity, shutting off the hard metal member from the outer air by closing the cavity with a metal covering means, heating up to hardening temperature and chilling the tool together with the covered hard metal member, and reducing the tool to its proper dimensions after hardening to expose the hard metal cutting edges.

6. The method of making and hardening steel tools provided with hard metal members consisting in forming a cavity in the tool, inserting the hard metal member in the said cavity, heating up to soldering heat, adding enough hard solder to amply cover the inserted hard metal member with liquid hard solder at the inlet opening of the said cavity, heating the tool and hard metal member up to hardening temperature, chilling, and exposing the hard metal cutting edge by removing the excess steel portions of the tool and excess hard solder.

The foregoing specification signed at Cologne, Germany, this 5th day of August, 1931.

ADOLF MEUTSCH.